(12) United States Patent
Lafe (10) Patent No.: US 6,556,961 B1
(45) Date of Patent: Apr. 29, 2003

(54) METHOD AND APPARATUS FOR PROCESS MODELING USING A DYNAMICAL SYSTEM

(75) Inventor: Olurinde E. Lafe, Chesterland, OH (US)

(73) Assignee: Innovative Computing Group, Inc., Mayfield Village, OH ( * ) Notice: Subject to any disclaimer, the term of this patent is extended or adjusted under 35 U.S.C. 154(b) by 0 days.

(21) Appl. No.: 09/625,154

(22) Filed: Jul. 25, 2000

Related U.S. Application Data (60) Provisional application No. 60/173,773, filed on Dec. 30, 1999.

(51) Int. Cl.[7] .......................... G06F 19/00; G06F 17/13
(52) U.S. Cl. .................................... 703/2; 703/5; 703/6
(58) Field of Search ................................ 703/2, 5, 6, 9; 702/50; 708/250, 490

(56) References Cited

U.S. PATENT DOCUMENTS

| | | | |
|---|---|---|---|
| 4,691,291 A | 9/1987 | Wolfram | 364/717 |
| 4,809,202 A | 2/1989 | Wolfram | 364/578 |
| 4,860,236 A | 8/1989 | McLeod et al. | 364/717 |
| 4,961,159 A | 10/1990 | McLeod et al. | 364/717 |
| 5,375,074 A | 12/1994 | Greenburg et al. | 364/578 |
| 5,594,671 A | 1/1997 | Chen et al. | 364/578 |
| 5,606,517 A | 2/1997 | Traub et al. | 364/578 |
| 5,848,260 A | 12/1998 | Chen et al. | 395/500 |
| 5,953,239 A | 9/1999 | Teixeira et al. | 364/578 |
| 6,243,663 B1 * | 6/2001 | Baty et al. | 703/2 |

FOREIGN PATENT DOCUMENTS

| | | |
|---|---|---|
| WO | 99/34309 | 7/1999 |

OTHER PUBLICATIONS

Lafe et al.; "A Global Interpolation Function Based Boundary Element Method for Determinsitic, Non–Homogeneous, and Stochastic Flows in Porous Media," Computer and Structures, 1995.

Lafe; "Data Compression and Encryption Using Cellular Automata Transforms," Engineering Applications of Artificial Intelligence, Dec. 1997.

\* cited by examiner

*Primary Examiner*—Russell Frejd
(74) *Attorney, Agent, or Firm*—Mark Kusner; Michael A. Jaffe

(57) ABSTRACT

A method and apparatus for modeling physical, chemical and sundry conceptual processes is taught. A family of multi, state dynamical systems are used to solve the differential equations that define these processes. Differential bases functions are generated from the evolving states of cellular automata. The use of the differential basis functions greatly simplifies the modeling process. The present invention avoids the use of millions of computational cells as required by the prior art.

12 Claims, 2 Drawing Sheets

METHOD AND APPARATUS FOR PROCESS MODELING USING A DYNAMICAL SYSTEM

RELATED APPLICATIONS

The present application claims the benefit of U.S. Provisional Application No. 60/173,773 filed Dec. 30, 1999.

FIELD OF INVENTION

The present invention generally relates to modeling processes, in such fields as those derived from physical, chemical, biological, financial and sundry conceptual mathematical systems. More particularly, the present invention relates to a method and apparatus for modeling processes using a multi-state dynamical system, such as cellular automata.

BACKGROUND OF THE INVENTION

Differential and integral equations result from the mathematical modeling of processes. For most complex phenomena, the number of independent variables (e.g., spatial coordinates and time) is more than one, and the full description of the process will require more than one dependent variable (e.g., velocity, temperature, displacement, stress). The governing equations for such processes are expressible in the form of partial differential equations (PDEs). These equations indicate the dependence of the characteristics of the process on the plethora of independent variables. For many physical phenomena, PDEs emerge from a continuum viewpoint. The continuum equations derive from statistical averaging of microscopic phenomena. For example, consider a physical process such as the movement of fluid in a container. We can look at the forces acting on small element of this fluid. This representative elementary volume, REV, should be small enough to allow us to say we are observing the flow at a point; but large enough to make a statistical averaging of the microscopic events meaningful. When statements pertaining to the conservation of mass, momentum and energy for this element are written, the result will be partial differential equations. Examples include the Navier-Stokes equations, Laplace's equation, Poisson equation, etc.

The common approach to solving these PDEs is the use of numerical techniques (e.g., finite difference, finite element, finite volume, method of characteristics, etc.) to integrate the pertinent continuum partial differential equations. Tremendous human and financial resources have been expended in the development of these computational methods.

Prior art involved a traditional approach to Cellular Automata (CA) Modeling. CA modeling, the basis of the legendary lattice-gas methods, involves the application of the evolving fields of cellular automata to represent the process being studied. The traditional CA modeling approach stands somewhere between the microscopic viewpoint and the continuum approach. In applying CA to a physical problem, an association must be established between known physical quantities of the problem and those calculated as a result of repeated iteration (using the CA rule) from a set of initial conditions. The process of relating particular CA rules to specific problems is not trivial. However, the association has already been made for a variety of complex nonlinear problems including hydrodynamics, flows in porous media, chemical turbulence, percolation and nucleation, diffusion-controlled reactions, and dynamical systems. Cellular Automata represent a serious and highly effective tool for studying the microscopic character of transport processes, and for solving the associated macroscopic (continuum) equations.

CA-based modeling offers advantages both in the representation of the underlying (physical, chemical, biological, etc.) process, and in the numerical solution of the problem. For example, the 1986 work of Frisch, Hasslacher, Pomeau (FHP) provided perhaps the first serious effort at using a CA-based method to solve the full Navier-Stokes equations. The fluid is represented by particles of unit mass and momentum moving in a triangular lattice. On reaching a node in the lattice, the particles go through a collision process in which there is redistribution along the available directions. The total mass and momentum is preserved at each node. Large-scale averages taken from the lattices are solutions to the full Navier-Stokes equations in an asymptotic limit.

The FHP work has had a significant impact on other CA-based modeling. For example, others have examined the potential applications of CA methods to the fluid flow in complex porous media, and have investigated CA models for simulating coupled solute transport and chemical reactions at mineral surfaces and in pore networks.

Amongst prior inventions that utilize variants of the lattice-gas approach in CA modeling include those taught by Wolfram (U.S. Pat. No. 4,809,202), Chen et al (U.S. Pat. No. 5,594,671), Traub et al (U.S. Pat. No. 5,606,517), Chen et al (U.S. Pat. No. 5,848,260), and Teixeira et al (U.S. Pat. No. 5,953,239).

BRIEF DESCRIPTION OF DRAWINGS

The invention may take physical form in certain parts and arrangements of parts, a preferred embodiment and method of which will be described in detail in this specification and illustrated in the accompanying drawings which form a part hereof, and wherein.

SUMMARY OF THE INVENTION

The CA Transform approach to solving PDEs is more direct than the traditional CA-based/lattice-gas method. In accordance with a preferred embodiment of the present invention, CA transform basis functions are used much in the same way traditional transforms, such as Fourier and Laplace transforms, are utilized. One advantage, in using CA transforms basis functions, is the immense number of transform bases. The desirable differential and integral properties of these transform bases can be exploited in obtaining robust solutions to PDEs.

According to the present invention there is provided a method of solving a governing equation expressed in terms of at least one differential equation, the including the steps of (a) selecting a transform basis function suitable for solving the at least one differential equation; (b) mapping the transform basis function in continuous space to form a mapped transform basis function; (c) deriving an Nth order differential transform basis function from the mapped transform basis function; (d) determining a first expression for the solution of the governing equation that includes a series in terms of the transform basis function and associated transform coefficients; (e) applying the first expression in the governing equation to obtain a second expression that includes the Nth order differential transform basis function and the associated transform coefficients, where $N \geq 1$; (f) determining a third expression by using orthogonal properties of the transform basis function to express the associated transform coefficients in terms of the solution; (g) applying the third expression to eliminate the associated transform coefficients in the second expression, to obtain a fourth expression; and (i) solving the fourth expression to obtain the unknowns of the differential equation.

According to another aspect of the present invention, there is provided a system for solving a governing equation expressed in terms of at least one differential equation, the system comprising: means for selecting a transform basis function suitable for solving the at least one differential equation; means for mapping the transform basis function in continuous space to form a mapped transform basis function; means for deriving an Nth order differential transform basis function from the mapped transform basis function; means for determining a first expression for the solution of the governing equation that includes a series in terms of the transform basis function and associated transform coefficients; means for applying the first expression in the governing equation to obtain a second expression that includes the Nth order differential transform basis function and the associated transform coefficients, where $N \geq 1$; means for determining a third expression by using orthogonal properties of the transform basis function to express the associated transform coefficients in terms of the solution; means for applying the third expression to eliminate the associated transform coefficients in the second expression, to obtain a fourth expression; and means for solving the fourth expression to obtain the unknowns of the differential equation.

One objective of the present invention is to provide an efficient solver for the continuum equations, rather than to model the microscopic process as done in the lattice-gas models. In the final analysis, except when called for by the resolution demands of the problem, millions of cells will not be needed to solve a given PDE. The number of computational nodes in a CAT-based solution will normally be of the same order of magnitude as those required in traditional solvers based on finite differences and finite element methods. The way the CA differential operators are defined also provides a robust transform tools for solving nonlinear equations.

Still other advantages and objectives of the invention will become apparent to those skilled in the art upon a reading and understanding of the following detailed description, accompanying drawings and appended claims. Furthermore, it will be appreciated, the present invention is capable of other and different embodiments, and its several details are capable of modifications in various respects, all without departing from the scope of the invention. Accordingly, the examples and description are to be regarded as illustrative in nature and not restrictive.

DETAILED DESCRIPTION OF THE INVENTION

It should be appreciated that while a preferred embodiment of the present invention will be described with reference to cellular automata as the dynamical system, other dynamical systems are also suitable for use in connection with the present invention, such as neural networks and systolic arrays.

It should be further understood that as described herein "transform basis functions" (also referred to as "filters") are comprised of a plurality of "building blocks," also referred to herein as "elements" or "transform bases." The elements of the transform basis function are obtained from the evolving field of cellular automata, as described below.

Consider a system whose underlying process is governed by a differential equation. Such systems include, but are not limited to, fluid flows, chemical reactions, weather patterns, financial markets, optical flows, biology, ecology, etc. The problem domain must be transformed into the cellular automata lattice space. If the domain is regular (e.g., rectangular) the CA lattice space may be a simple discretized version of the physical problem domain. In that case, the character of the partial differential equation remains unchanged. If the domain is irregular, the mapping will be more complex, and the nature of the PDE, and its associated initial/boundary conditions, may be different in the CA lattice space. In the following description it is assumed that the necessary transformation has been carried out and the PDE is the appropriate equation to be solved in the CA space.

Consider a process governed by the differential equation:

$$D[\phi(x, t)] = f(x, t)$$

in which $\phi$ is the dependent variable (e.g., velocity, temperature, pressure, displacement, voltage, current, etc.), D is a differential operator, $f$ is a known forcing function (e.g., effects of sources/sinks and other distributed effects), x is space and t is time. Table 1.1 shows the form of D and the meaning of $\phi$ for some common physics problems.

TABLE 1.1

Differential operators for some common processes

| Physical Process | Differential Operator, D | Meaning of $\phi$ |
|---|---|---|
| Potential Flows | $\nabla^2$ | Potential |
| Heat Conduction | $\nabla \cdot (h\nabla) - \sigma \partial/\partial t$ | Temperature |
| Plate Deformation | $\nabla^4$ | Deformation |
| Vibration | $\nabla^4 - a\partial^2/\partial t^2$ | Displacement |
| Convective-Diffusion | $\partial/\partial t + V \cdot \nabla - \nabla \cdot (h\nabla)$ | Pressure |
| Wave Scattering | $\nabla^2 - k^2$ | Wave Field |

The CAT-based solution of a differential equation requires the use of cellular automata (CA) differential operators. These CA differential operators are CA transform bases ("differential transform bases") that are used to differentiate a given function. They are derived from CA transform basis functions. Once the CA differential operator is known, the solution is sought by determining the CA transform coefficients associated with the differential transform bases, as will be described in detail below.

Cellular Automata (CA) are dynamical systems in which space and time are discrete. The cells are arranged in the form of a regular lattice structure and must each have a finite number of states. These states are updated synchronously according to a specified local rule of interaction. For example, a simple 2-state 1-dimensional cellular automaton will have a line of cells/sites, each of which can take value 0 or 1. Using a specified rule (usually deterministic), the values are updated synchronously in discrete time steps for all cells. With a K-state automaton, each cell can take any of the integer values between 0 and K−1. In general, the rule governing the evolution of the cellular automaton will encompass m sites up to a finite distance r away. Accordingly, the cellular automaton is referred to as a K-state, m-site neighborhood CA.

In accordance with the present invention, the number of dynamical system rules available for a given compression problem can be astronomical even for a modest lattice space, neighborhood size, and CA state. Therefore, in order to develop practical applications a system must be developed for addressing the pertinent CA rules. Consider, for an example, a K-state N-node cellular automaton with m=2r+1 points per neighborhood. Hence in each neighborhood, if we choose a numbering system that is localized to each neighborhood, the following represents the states of the cells at time t: $a_{it}$(i=0,1,2,3, . . . m−1). The rule of evolution of a cellular automaton is defined by using a vector of integers $W_j$(j=0,1,2,3, . . . ,$2^m$) such that $$a_{(r)(t+1)} = \left( \sum_{j=0}^{2^m-2} W_j \alpha_j + W_{2^m-1} \right)^{W_{2^m}} \mod K \quad (1)$$

where $0 \leq W_j < K$ and $\alpha_j$ are made up of the permutations of the states of the cells in the neighborhood. To illustrate these permutations consider a 3-neighborhood one-dimensional CA. Since m=3, there are $2^3$=8 integer W values. The states of the cells are (from left-to-right) $a_{0t}$, $a_{1t}$, $a_{2t}$ at time t. The state of the middle cell at time t+1 is:

$$a_{1(t+1)} = (W_0 a_{0t} + W_1 a_{1t} + W_2 a_t W_3 a_{0t} a_{1t} + W_4 a_{1t} a_{2t} + W_5 a_{2t} a_{0t} + W_6 a_{0t} a_{1t} a_{2t} + W_7)^{W_8} \mod K \quad (2)$$

Hence each set of $W_j$ results in a given rule of evolution. The chief advantage of the above rule-numbering scheme is that the number of integers is a function of the neighborhood size; it is independent of the maximum state, K, and the shape/size of the lattice.

Given a data $f$ in a D dimensional space measured by the independent discrete variable i, we seek a transformation in the form:

$$f_i = \sum_k c_k A_{ik} \quad (3)$$

where A are cellular automata transform bases, k is a vector (defined in D) of non-negative integers, while c are transform coefficients whose values are obtained from the inverse transform:

$$c_k = \sum_k f_i B_{ik} \quad (4)$$

in which transform bases $B_{ik}$ is the inverse of transform bases $A_{ik}$.

When the transform bases $A_{ik}$ are orthogonal, the number of transform coefficients is equal to that in the original data $f$. Furthermore, orthogonal transformation offers considerable simplicity in the calculation of the transform coefficients. From the point-of-view of general digital signal processing applications, orthogonal transform bases are preferable on account of their computational efficiency and elegance. The forward and inverse transform bases A and B are generated from the evolving states a of the cellular automata. Set forth below is an outline of how these transform bases are generated.

A given CA transform basis function is characterized by one (or a combination) of the following features:

1. The method used in calculating the transform bases from the evolving states of cellular automata.
2. The orthogonality or non-orthogonality of the transform basis function.
3. The method used in calculating the transform coefficients associated with the transform basis function (i.e., orthogonal transformation is the easiest).

The simplest transform bases are those with transform coefficients (1,−1) and are usually derived from dual-state cellular automata. Some transform bases are generated from the instantaneous point density of the evolving field of the cellular automata. Other transform basis functions are generated from a multiple-cell-averaged density of the evolving automata.

One-dimensional (D=1) cellular spaces offer the simplest environment for generating CA transform bases. They offer several advantages, including:

(a) a manageable alphabet base for small neighborhood size, m, and maximum state K. This is a strong advantage in data compression applications.

(b) The possibility of generating higher-dimensional bases from combinations of the one-dimensional.

(c) The excellent knowledge base of one-dimensional cellular automata.

In a 1D space our goal is to generate the transform basis function $$A = A_{ik} \; i, k=0,1,2, \ldots N-1$$

from a field of L cells evolved for T time steps. Therefore, considering the data sequence $f_i$(i=0,1,2, . . . N−1), we write:

$$f_i = \sum_{k=0}^{N-1} c_k A_{ik} \quad i, k = 0, 1, 2, \ldots N-1 \quad (5)$$

in which $c_k$ are the transform coefficients. There are infinite ways by which $A_{ik}$ can be expressed as a function of the evolving field of the cellular automata $a \equiv a_{it}$, (i=0, 1, 2, . . . L−1; t=0, 1, 2, . . . T−1). A few of these are enumerated below.

Figure 1:
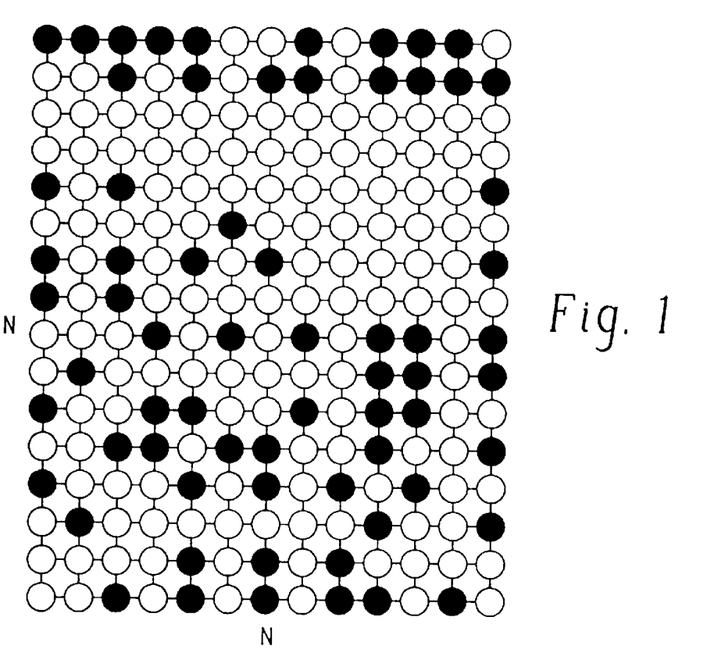
FIG. 1 illustrates cellular automata lattice space cell arrangements in accordance with a Class I scheme, wherein the bottom base states form the initial configuration, and N cells are evolved over N time steps.

Referring now to FIG. 1, the simplest way of generating the transform bases is to evolve N cells over N time steps. That is, L=T=N. This results in $N^2$ coefficients from which the "building blocks" $A_{ik}$ can be derived. This is referred to herein as the Class I Scheme.

Figure 2:
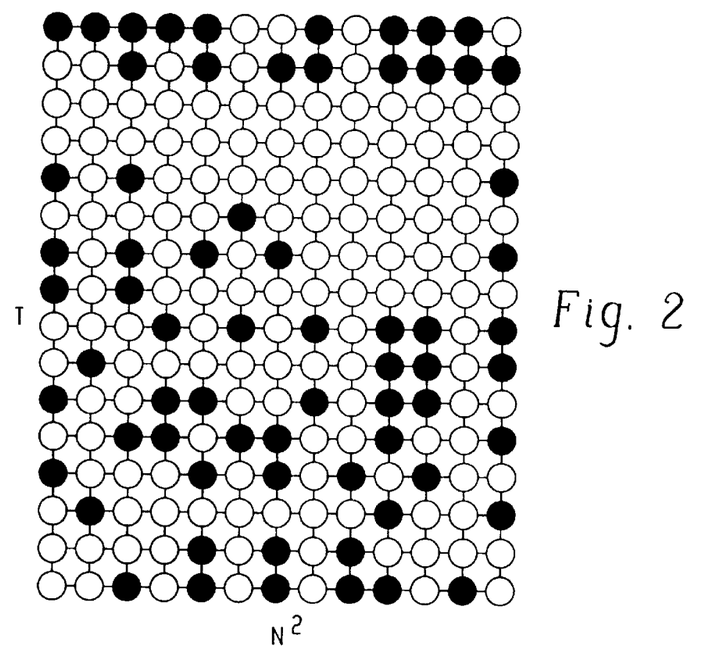
FIG. 2 illustrates cellular automata lattice space cell arrangements for a Class II scheme, wherein the bottom base states (with $N^2$ cells) form the initial configuration, and $N^2$ cells are evolved over T time steps.

A more universal approach, referred to herein as the Class II Scheme, selects $L=N^2$ (i.e., the number of transform coefficients to be derived) and makes the evolution time T independent of the number of transform coefficients forming the transform basis function. This scheme is illustrated in FIG. 2. One major advantage of the latter approach is the flexibility to tie the transform bases precision to the evolution time T.

Class I Scheme

When the N cells are evolved over N times steps, we obtain $N^2$ integer transform coefficients:

$$a \equiv a_{it}, \; (i, t=0, 1, 2, \ldots N-1)$$

which are the states of the cellular automata including the initial configuration. A few transform bases types belonging to this group include:

Type 1: $A_{ik} = \alpha + \beta a_{ik}$ where $a_{ik}$ is the state of the CA at the node i at time t=k while $\alpha$ and $\beta$ are constants.

Type 2: $A_{ik}=\alpha+\beta a_{ik}a_{ki}$

Class II Scheme

Two types of transform basis functions are showcased under this scheme:

Type 1: $A_{ik} = \alpha + \beta \sum_{t=0}^{T-1} a_{(k+iN)(T-1-t)}/K^t$ in which K is the maximum state of the automaton.

Type 2: $A_{ik} = \sum_{t=0}^{T-1} \{a_{(k+iN)(T-1-t)} - \beta\}$

In most applications we desire to have transform basis functions that are orthogonal. That is we want transform bases $A_{ik}$ to satisfy:

$$\sum_{i=0}^{N-1} A_{ik}A_{il} = \begin{cases} \lambda_k & k=l \\ 0 & k \neq l \end{cases} \quad (6)$$

where $\lambda_k$(k=0,1, ... N-1) are coefficients. The transform coefficients are easily computed as:

$$c_k = \frac{1}{\lambda_k}\sum_{i=0}^{N-1} f_i A_{ki} \quad (7)$$

That is, the inverse transform bases are:

$$B_{ik} = \frac{A_{ki}}{\lambda_k} \quad (8)$$

A limited set of orthogonal CA transform bases is symmetric: $A_{ik}=A_{ki}$. The symmetry property can be exploited in accelerating the CA transform process. The transform basis functions calculated from the CA states will generally not be orthogonal. There are simple normalization/scaling schemes that can be utilized to make these orthogonal and also satisfy other conditions (e.g., smoothness of reconstructed data) that may be required for a given problem.

The tacit assumption in the above derivations is that the CA filters are applied in a non-overlapping manner. Hence given a data, $f$, of length L, the filters A of size N×N are applied in the form:

$$f_i = \sum_{k=0}^{N-1} c_{kj}A_{(i \bmod N)k} \quad (9)$$

where i=0,1,2, ... L−1 and j=0,1,2, ... (L/N)−1 is a counter for the non-overlapping segments. The transform coefficients for points belonging to a particular segment are obtained solely from data points belonging to that segment. However, CA transform basis functions can be evolved as overlapping filters. In this case, if $l=N-N_1$ is the overlap, then the transform equation will be in the form:

$$f_i = \sum_{k=0}^{N-1} c_{kj}A_{(i \bmod N_l)k} \quad (10)$$

where i=0,1,2, ... L−1 and j=0,1,2, ... (L/$N_1$)−1 is the counter for overlapping segments. The condition at the end of the segment when i>L−N is handled by either zero padding or the usual assumption that the data is cyclic. Overlapped filters allow the natural connectivity that exists in a given data to be preserved through the transform process. Overlapping filters generally produce smooth reconstructed signals even after a heavy decimation of a large number of the transform coefficients.

CA Differential Operators are CA transform bases which can be used to differentiate a given function. They are constructed from CA transform basis functions by mapping from the discrete cellular space to the continuous world of the process. In order to illustrate how these CA differential operators are obtained, consider the discretized form of the function p(x), and its first derivative p'(x) along the line $0 \leq x \leq L$. N computational nodes are selected on this line, so that the location of the i-th node is x=iL/(N−1).

The function is expanded in terms of orthogonal transform bases $A_{ik}$ and its derivative using the differential transform bases $D_{ik}$ $$p_i = \sum_{k=0}^{N-1} c_k A_{ik} \quad (11)$$

$$\frac{dp_i}{dx} = p'_i = \frac{1}{\Lambda_i}\sum_{k=0}^{N-1} c_k D_{ik} \quad (12)$$

where $D_{ik}$=d/di($A_{ik}$) are differential transform bases and $\Lambda_i$ are scaling parameters. In order to obtain $D_{ik}$ the transform bases $A_{ik}$ must be differentiated. It is desired to map $A_{ik}$ into an analytic function so the derivative can be carried out exactly. Accordingly, the discrete cellular space is mapped to a continuous space. For example, assuming an N-th order polynomial fit, let $$A_{ik} = \sum_{j=0}^{N-1} \beta_{jk}(1+i)^j \quad (13)$$

where $\beta_{jk}$(j,k=0,1, ... N−1) are constants obtained by:

$$\{\beta_k\}=[G]^{-1}\{A_k\}$$

in which $G_{ij}=(1+i)^j$. The above must be solved for k=0,1, 2, ... N−1. With the constants thus determined the following is obtained:

$$D_{ik} = \sum_{j=0}^{N-1} j\beta_{jk}(1+i)^{j-1}$$

The transform basis functions, shown in Table 1.2 are derived from a Class II 64-cell multi-state cellular automata using the W-set coefficients. Tables 1.2 through Table 1.6 show the results of using the differential transform basis functions on some common functions. Since the filter size is N=8, the points (0,7,8,15) are end points. It should be appreciated that the largest errors occur at the end points because the original transform basis functions are non-overlapping. Overlapping filters automatically incorporate the pertinent continuity constraints required at the end points. This is the primary reason for the usefulness in overlapping filters in the lossy compression of images since some degree of smoothness (sans pixelization) can be maintained at low bit rates.

TABLE 1.2

CAT 8 × 8 orthogonal non-overlap basis functions.

| i | k=0 | 1 | 2 | 3 | 4 | 5 | 6 | 7 |
|---|---|---|---|---|---|---|---|---|
| 0 | 0.8800 | 0.1491 | 0.3428 | −0.2695 | 0.0411 | −0.0593 | −0.0176 | −0.0877 |
| 1 | 0.4400 | −0.5556 | −0.4083 | 0.5161 | −0.1189 | 0.2029 | −0.0027 | 0.0967 |
| 2 | 0.1735 | 0.7331 | −0.6173 | 0.1622 | −0.0069 | −0.0794 | 0.0805 | 0.1104 |
| 3 | 0.0392 | −0.3621 | −0.4754 | −0.5607 | 0.2448 | −0.4875 | 0.1624 | 0.0546 |
| 4 | −0.0041 | 0.0107 | −0.1735 | −0.2695 | 0.5038 | 0.7608 | 0.1731 | −0.1862 |
| 5 | 0.0021 | 0.0124 | 0.0972 | 0.4682 | 0.6375 | −0.3619 | 0.0428 | −0.4816 |
| 6 | 0.0165 | 0.0160 | 0.1458 | 0.0936 | 0.5138 | −0.0139 | −0.2983 | 0.7851 |
| 7 | −0.0021 | −0.0036 | −0.2187 | −0.1405 | 0.0000 | 0.0383 | −0.9198 | −0.2913 |

TABLE 1.3

Original function, $f(i) = \sin(i)$; Exact differential $f'(i) = \cos(i)$

| i | CAT Differential | Exact |
|---|---|---|
| 0 | 1.00346016 | 1.00000000 |
| 1 | 0.54128360 | 0.54030231 |
| 2 | −0.41700559 | −0.41614684 |
| 3 | −0.98916573 | −0.98999250 |
| 4 | −0.65482921 | −0.65364362 |
| 5 | 0.28587772 | 0.28366219 |
| 6 | 0.95159636 | 0.96017029 |
| 7 | 0.81687844 | 0.75390225 |
| 8 | −0.23789371 | −0.14550003 |
| 9 | −0.89783136 | −0.91113026 |
| 10 | −0.84358606 | −0.83907153 |
| 11 | 0.00681705 | 0.00442570 |
| 12 | 0.84132898 | 0.84385396 |
| 13 | 0.91112688 | 0.90744678 |
| 14 | 0.12767500 | 0.13673722 |
| 15 | −0.70040373 | −0.75968791 |

TABLE 1.4

Original function, $f(i) = (i/15)^3$; Exact differential $f'(i) = 3(i/15)^2$

| i | CAT Differential | Exact |
|---|---|---|
| 0 | 0.00000043 | 0.00000000 |
| 1 | 0.00073348 | 0.00073242 |
| 2 | 0.00293163 | 0.00292969 |
| 3 | 0.00659503 | 0.00659180 |
| 4 | 0.01172387 | 0.01171875 |
| 5 | 0.01831847 | 0.01831055 |
| 6 | 0.02637927 | 0.02636719 |
| 7 | 0.03590680 | 0.03588867 |
| 8 | 0.04688949 | 0.04687500 |
| 9 | 0.05936193 | 0.05932617 |
| 10 | 0.07330860 | 0.07324219 |
| 11 | 0.08872767 | 0.08862305 |
| 12 | 0.10561279 | 0.10546875 |
| 13 | 0.12395098 | 0.12377930 |
| 14 | 0.14371967 | 0.14355469 |
| 15 | 0.16488308 | 0.16479492 |

TABLE 1.5

Original Function $f(i) = \log(1 + i)$; Exact differential $f'(i) = 1.0/(1 + i)$

| i | CAT Differential | Exact |
|---|---|---|
| 0 | 0.95974775 | 1.00000000 |
| 1 | 0.50342467 | 0.50000000 |
| 2 | 0.33282341 | 0.33333333 |
| 3 | 0.25075953 | 0.25000000 |

TABLE 1.5-continued

Original Function $f(i) = \log(1 + i)$; Exact differential $f'(i) = 1.0/(1 + i)$

| i | CAT Differential | Exact |
|---|---|---|
| 4 | 0.20023316 | 0.20000000 |
| 5 | 0.16763469 | 0.16666667 |
| 6 | 0.14215313 | 0.14285714 |
| 7 | 0.13138732 | 0.12500000 |
| 8 | 0.11120955 | 0.11111111 |
| 9 | 0.10025264 | 0.10000000 |
| 10 | 0.09138133 | 0.09090909 |
| 11 | 0.08407202 | 0.08333333 |
| 12 | 0.07790951 | 0.07692308 |
| 13 | 0.07251541 | 0.07142857 |
| 14 | 0.06748844 | 0.06666667 |
| 15 | 0.06235679 | 0.06250000 |

TABLE 1.6

Original Function $f(i) = \exp(-i)$; Exact differential $f'(i) = -\exp(-i)$

| i | CAT Differential | Exact |
|---|---|---|
| 0 | 0.99260880 | 1.00000000 |
| 1 | 0.36878606 | 0.36787944 |
| 2 | 0.03504870 | 0.13533528 |
| 3 | 0.04989474 | 0.04978707 |
| 4 | 0.01812182 | 0.01831564 |
| 5 | 0.00682391 | 0.00673795 |
| 6 | 0.00176014 | 0.00247875 |
| 7 | 0.00409579 | 0.00091188 |
| 8 | 0.00033298 | 0.00033546 |
| 9 | 0.00012371 | 0.00012341 |
| 10 | 0.00004530 | 0.00004540 |
| 11 | 0.00001674 | 0.00001670 |
| 12 | 0.00000608 | 0.00000614 |
| 13 | 0.00000229 | 0.00000226 |
| 14 | 0.00000059 | 0.00000083 |
| 15 | 0.00000137 | 0.00000031 |

TABLE 1.7

Original Function $f(i)$ i $\cos(i)$; Exact differential $f'(i) = \cos(i) - i \sin(i)$

| i | CAT Differential | Exact |
|---|---|---|
| 0 | 0.73853237 | 1.00000000 |
| 1 | −0.25037267 | −0.30116868 |
| 2 | −2.25669809 | −2.23474169 |
| 3 | −1.39831986 | −1.41335252 |
| 4 | 2.35519770 | 2.37356636 |
| 5 | 5.11053817 | 5.07828356 |
| 6 | 2.53456580 | 2.63666328 |
| 7 | −3.10574526 | −3.84500394 |

TABLE 1.7-continued

Original Function f(i) i cos(i); Exact differential f'(i) = cos(i) − i sin(i)

| i | CAT Differential | Exact |
|---|---|---|
| 8 | −8.63204849 | −8.06036601 |
| 9 | −4.55340066 | −4.62019663 |
| 10 | 4.58559693 | 4.60113958 |
| 11 | 11.01022228 | 11.00431797 |
| 12 | 7.28339932 | 7.28272897 |
| 13 | −4.55917990 | −4.55472470 |
| 14 | −13.68438531 | −13.73176576 |
| 15 | 10.94743103 | −10.51400552 |

The procedure for solving a differential equation using CAT filters is generally as follows:

1. Evolve a dynamical system (e.g., a cellular automaton) as outlined above, to obtain a transform basis function (transform bases) suitable for solving the differential equation.
2. Map the tramform basis function from the discrete space to a continuous space (cf polynomial map used above).
3. Derive an Nth order differential transform basis function from the mapped transform basis function.
4. Determine a first expression for the solution to the problem in the form of a CAT series, in terms of the transform basis function and associated transform coefficients. This expression will contain the associated transform coefficients as unknowns.
5. Apply the first expression to the governing (differential) equation, to obtain a second expression that includes the Nth order differential transform basis function and the associated transform coefficients.
6. Determine a third expression by using the orthogonality property of the transform basis function to express the associated transform coefficients in terms of the solution to the differential equation.
7. Apply the third expression to eliminate the transform coefficients in the second expression, to obtain a fourth expression. Consequently, the unknowns will be the dependent variables at the cells.
8. Introduce the boundary and/or initial conditions.
9. Solve the ensuing system of equations (e.g., the fourth expression) to determine the unknown quantities of the differential equation.

NUMERICAL EXAMPLES

One-dimensional Example

The above solution steps are illustrated with a simple example. Consider the one-dimensional heat conduction problem in a rod of length L:

$$\frac{d^2\Phi}{dX^2} = F(X)$$

$$\Phi(0) = T_0$$

$$\Phi(L) = T_L$$

Where F(X) is a heat recharge term. This is rendered dimensionless by defining:

$$x = X/L$$

$$\phi = (\Phi - T_0)/(T_L - T_0)$$

$$f = FL^2/(T_L - T_0)$$

so as to obtain:

$$\frac{d^2\phi}{dx^2} = f(x) \quad (14)$$

$$\phi(0) = 0$$

$$\phi(1) = 1$$

t The region $0 \leq x \leq 1$ is divided into N segments. Let $i = (N-1)x$. The solution is the form $$\phi_i = \sum_{k=0}^{N-1} c_k A_{ik} \quad (15)$$

The above expression is used in the governing equation to obtain:

$$\sum_{k=0}^{N-1} c_k D_{ik} = \frac{f(x)}{(N-1)^2} \quad (16)$$

where $$D_{ik} = \frac{d^2 A_{ik}}{di^2} \quad (17)$$

Since the transform bases $A_{ik}$ are orthonormal, the following can be written:

$$c_k = \sum_{j=0}^{N-1} \phi_j A_{kj} \quad (18)$$

which when used in equation (16) results in:

$$\sum_{k=0}^{N-1} \left( \sum_{j=0}^{N-1} \phi_j A_{kj} \right) D_{ik} = \frac{f(x)}{(N-1)^2} \quad (19)$$

or $$\sum_{j=0}^{N-1} \phi_j H_{ij} = \frac{f(x)}{(N-1)^2} \quad (20)$$

in which $$H_{ij} = \sum_{k=0}^{N-1} A_{kj} D_{ik} \quad (21)$$

Using the orthonormal transform basis functions shown in Table 1.1, the associated second order differential basis functions Dik are shown in Table 1.8. The solution matrix $H_{ij}$ is shown in Table 1.9.

TABLE 1.8

Second Order Differential Basis Functions, $D_{ik}$

| i | k=0 | 1 | 2 | 3 | 4 | 5 | 6 | 7 |
|---|---|---|---|---|---|---|---|---|
| 0 | 33.3752 | −39.5115 | −49.4402 | 37.6686 | 12.7953 | 13.3172 | 20.3110 | −7.9155 |
| 1 | −1.9037 | 4.8928 | 2.1228 | −3.0780 | −1.4221 | −1.1173 | −1.6839 | 0.4345 |
| 2 | −0.7540 | 0.4238 | 2.3005 | 0.4367 | 0.2100 | 0.5677 | −0.0088 | 0.2637 |
| 3 | 1.3063 | −2.1390 | −1.4742 | 1.3112 | 1.1154 | −0.1189 | 0.7316 | 0.0385 |
| 4 | −0.6519 | 1.4569 | 0.2313 | −2.1934 | −0.6357 | −1.6015 | −1.2464 | 0.0140 |
| 5 | −0.0856 | −0.2127 | 0.5729 | 1.2390 | −1.0897 | 1.4952 | 0.0012 | −1.1580 |
| 6 | 1.9026 | −3.3988 | −1.8463 | 3.8727 | 0.8275 | 2.0793 | 3.0522 | 0.1803 |
| 7 | −22.5525 | 41.6712 | 18.7477 | −53.1871 | −5.4522 | −35.6749 | −15.9744 | 19.3007 |

TABLE 1.9

Solution Matrix, $H_{ij}$

| i | k=0 | 1 | 2 | 3 | 4 | 5 | 6 | 7 |
|---|---|---|---|---|---|---|---|---|
| 0 | 5.2115 | −22.3016 | 43.9536 | −52.7271 | 41.0042 | −20.1022 | 5.6618 | −0.7001 |
| 1 | 0.7000 | −0.3889 | −2.6999 | 4.7499 | −3.7221 | 1.7999 | −0.5000 | 0.0611 |
| 2 | −0.0611 | 1.1887 | −2.0995 | 0.7216 | 0.4729 | −0.3003 | 0.0890 | −0.0111 |
| 3 | 0.0112 | −0.1504 | 1.5010 | −2.7235 | 1.5012 | −0.1506 | 0.0113 | −0.0000 |
| 4 | 0.0001 | 0.0105 | −0.1485 | 1.4978 | −2.7202 | 1.4989 | −0.1497 | 0.0111 |
| 5 | −0.0109 | 0.0878 | −0.2972 | 0.4679 | 0.7260 | −2.1021 | 1.1896 | −0.0612 |
| 6 | 0.0614 | −0.5011 | 1.8028 | −3.7269 | 4.7538 | −2.7021 | −0.3881 | 0.6999 |
| 7 | −0.7003 | 5.6636 | −20.1065 | 41.0084 | −52.7306 | 43.9547 | −22.3012 | 5.2113 |

The solution process need not involve an explicit inversion of the solution matrix. In fact, an interative solution of the following form is favored:

$$\phi_i^{n+1} = \theta\phi_i^n + (1-\theta)\left(f_i - \sum_{j=0; j\neq i}^{N-1} H_{ij}\phi_j^n\right) / H_{ii} \quad (22)$$

Where n is the iteration step, and $0<\theta<1$ is a relaxation parameter. The above scheme also allows an easy incorporation of the boundary condition. Table 1.10 shows the solution for the case $f(x)=x^2$. The accuracy of the CAT solution is clearly evident.

TABLE 1.10

Solution for $f(x) = x^2$. Exact $\phi(x) = x(x^3 + 11)/12$

| i | x | CAT Solution | Exact |
|---|---|---|---|
| 0 | 0.00000000 | 0.00000000 | 0.00000000 |
| 1 | 0.14285714 | 0.13108258 | 0.13098709 |
| 2 | 0.28571429 | 0.26261969 | 0.26246009 |
| 3 | 0.42857143 | 0.39585042 | 0.39566847 |
| 4 | 0.57142857 | 0.53285219 | 0.53269471 |
| 5 | 0.71428571 | 0.67654744 | 0.67645426 |
| 6 | 0.85714286 | 0.83071417 | 0.83069554 |
| 7 | 1.00000000 | 1.00000000 | 1.00000000 |

An easy extension of the solution process is the case of a heat leakage problem:

$$\frac{d^2\phi}{dx^2} - \lambda^2\phi = f(x) \quad (23)$$

$\phi(0) = 0$ $\phi(1) = 1$

Where $\lambda^2\phi$ is the leakage parameter. The iterative solution involves simply augmenting the forcing function $f(x)$ with the leakage term:

$$\phi_i^{n+1} = \theta\phi_i^n + (1-\theta)\left(f_i + \lambda^2\phi_i^n - \sum_{j=0; j\neq i}^{N-1} H_{ij}\phi_j^n\right) / H_{ii} \quad (24)$$

The CAT solution on Table 1.11.

TABLE 1.11

Solution for $\lambda = 1$ and $f(x) = x^2$.
Exact $\phi(x) = (11 \sinh(\lambda x)/\sinh(\lambda) + x^4)/12$

| i | x | CAT Solution | Exact |
|---|---|---|---|
| 0 | 0.00000000 | 0.00000000 | 0.00000000 |
| 1 | 0.14285714 | 0.11157523 | 0.11184386 |
| 2 | 0.28571429 | 0.22589054 | 0.22645934 |
| 3 | 0.42857143 | 0.34652720 | 0.34742833 |
| 4 | 0.57142857 | 0.47803389 | 0.47926015 |
| 5 | 0.71428571 | 0.62602391 | 0.62744109 |
| 6 | 0.85714286 | 0.79729875 | 0.79848704 |
| 7 | 1.00000000 | 1.00000000 | 1.00000000 |

Problems involving other derivatives can be determined the same way the first and second order derivatives have been obtained above. For example, the q-th derivative is:

$$f_i^q = \sum_{k=0}^{N-1} c_k D_{ik}^q \quad (25)$$

where $D_{ik}^q$ are the q-th order differential operator.

Two-dimensional Example

The earlier numerical example is based on a one-dimensional differential equation problem. The following example shows how a one-dimensional CAT transform basis function can be used in solving a multi-dimensional problem. Consider the two-dimentional Poisson equation:

$$\frac{\partial^2 \phi}{\partial x^2} + \frac{\partial^2 \phi}{\partial y^2} = f(x, y) \quad (26)$$

With the Dirichlet condition $\phi = \phi_b$ on the boundary $\Gamma = \Gamma_b$. The region is divided into an N×N grid and assume the solution in the form:

$$\phi_{ij} = \sum_{m=0}^{N-1}\sum_{n=0}^{N-1} c_{mn} A_{im} A_{jn} \quad (27)$$

where x=j/(N−1),y=i/(N−1), A.. are orthonormal one-dimensional CA transform basis functions and $C_{mn}$ are the transform coefficients. Given the second-order differential bases:

$$D_{im} = \frac{d^2 A_{im}}{d i^2}$$

the governing equation can be transformed into the form $$\sum_{m=0}^{N-1}\sum_{n=0}^{N-1} c_{mn}(D_{im}A_{jn} + A_{im}D_{jn}) = f_{ij}/(N-1)^2 \quad (28)$$

Since the transform basis functions are orthonormal, the transform coefficients can be obtained in the form:

$$c_{mn} = \sum_{k=0}^{N-1}\sum_{l=0}^{N-1} \phi_{kl} A_{mk} A_{nl} \quad (29)$$

which when used in equation (28) results in[1]

$$\sum_{k=0}^{N-1}\sum_{l=0}^{N-1} \phi_{kl} J_{ijkl} = f_{ij}/(N-1)^2 \quad (30)$$

in which the solution matrix is $$H_{ijkl} = \sum_{m=0}^{N-1}\sum_{n=0}^{N-1} A_{mk} A_{nl}(D_{im}A_{jn} + A_{im}D_{jn}) \quad (31)$$

It should be noted that equation (30) provides a means for carrying out the Laplacean differentiation of a given two-dimensional function. Such differentiation can be used for digital image edge detection. Hence, if the image (size N×N) is f, its Laplacean is $$f_{ij} = (N-1)^2 \sum_{k=0}^{N-1}\sum_{l=0}^{N-1} \phi_{kl} H_{ijkl}.$$

Similar derivations can be performed in higher dimensions. Using the CA transform basis functions shown in Table 1.12, the result of a numerical solution of the Poisson problem, with $f(x, y)=x/(1+y)^2$ on a unit square, is presented in Table 1.13. The imposed condition on the boundary is $$\phi(x_b,y_b)=\cos(x_b)\sin h(y_b)+x_b \log(1+y_b) \quad (32)$$

TABLE 1.12

Basis functions A used to construct Poisson solver

| i | j=0 | 1 | 2 | 3 | 4 | 5 | 6 | 7 |
|---|---|---|---|---|---|---|---|---|
| 0 | 0.8975 | −0.1787 | 0.2661 | 0.1212 | −0.1107 | −0.1533 | 0.0728 | 0.1894 |
| 1 | −0.4177 | 0.6143 | −0.3826 | −0.3094 | 0.1909 | 0.2578 | −0.1306 | −0.2931 |
| 2 | −0.1376 | −0.7148 | −0.6087 | −0.0204 | 0.1496 | 0.1773 | −0.0765 | −0.1982 |
| 3 | −0.0075 | 0.2814 | −0.5446 | 0.6891 | −0.0921 | −0.2599 | 0.0929 | 0.2538 |
| 4 | 0.0223 | −0.0049 | −0.3230 | −0.6090 | −0.3918 | −0.5242 | 0.2355 | 0.2009 |
| 5 | 0.0016 | 0.0153 | −0.0762 | −0.0093 | −0.6068 | 0.7111 | 0.2090 | 0.2761 |
| 6 | −0.0197 | −0.0014 | 0.0629 | 0.1987 | −0.5945 | −0.1702 | −0.1289 | −0.7463 |
| 7 | 0.0077 | −0.0110 | −0.0377 | −0.0609 | −0.2123 | −0.0385 | −0.9205 | 0.3173 |

TABLE 1.13

Solution at internal nodes for two-dimensional Poisson problem

| i | j | x | y | CAT Solution | Exact | Error |
|---|---|---|---|---|---|---|
| 1 | 1 | 0.14285714 | 0.14285714 | 0.15200889 | 0.16095926 | 0.0090 |
| 1 | 2 | 0.28571429 | 0.14285714 | 0.16343881 | 0.17568431 | 0.0122 |
| 1 | 3 | 0.42857143 | 0.14285714 | 0.17655744 | 0.18760735 | 0.0110 |
| 1 | 4 | 0.57142857 | 0.14285714 | 0.18722981 | 0.19687410 | 0.0096 |
| 1 | 5 | 0.71428571 | 0.14285714 | 0.19292361 | 0.20368441 | 0.0108 |
| 1 | 6 | 0.85714286 | 0.14285714 | 0.20465116 | 0.20828818 | 0.0036 |
| 2 | 1 | 0.14285714 | 0.28571429 | 0.31749386 | 0.32256926 | 0.0051 |
| 2 | 2 | 0.28571429 | 0.28571429 | 0.34308845 | 0.34968065 | 0.0066 |
| 2 | 3 | 0.42857143 | 0.28571429 | 0.36313766 | 0.37113074 | 0.0080 |
| 2 | 4 | 0.57142857 | 0.28571429 | 0.37715340 | 0.38721394 | 0.0101 |
| 2 | 5 | 0.71428571 | 0.28571429 | 0.38668853 | 0.39833406 | 0.0116 |
| 2 | 6 | 0.85714286 | 0.28571429 | 0.39996958 | 0.40499597 | 0.0050 |
| 3 | 1 | 0.14285714 | 0.42857143 | 0.50220436 | 0.48826492 | 0.0139 |
| 3 | 2 | 0.28571429 | 0.42857143 | 0.54361087 | 0.52580830 | 0.0178 |
| 3 | 3 | 0.42857143 | 0.42857143 | 0.56381714 | 0.55471535 | 0.0091 |
| 3 | 4 | 0.57142857 | 0.42857143 | 0.57390827 | 0.57543521 | 0.0015 |
| 3 | 5 | 0.71428571 | 0.42857143 | 0.58185989 | 0.58858387 | 0.0067 |
| 3 | 6 | 0.85714286 | 0.42857143 | 0.58658636 | 0.59493153 | 0.0083 |
| 4 | 1 | 0.14285714 | 0.57142857 | 0.68680215 | 0.66146472 | 0.0253 |
| 4 | 2 | 0.28571429 | 0.57142857 | 0.74138319 | 0.70773020 | 0.0337 |
| 4 | 3 | 0.42857143 | 0.57142857 | 0.76497257 | 0.74220774 | 0.0228 |
| 4 | 4 | 0.57142857 | 0.57142857 | 0.77502900 | 0.76551044 | 0.0095 |
| 4 | 5 | 0.71428571 | 0.57142857 | 0.78053194 | 0.77847903 | 0.0021 |
| 4 | 6 | 0.85714286 | 0.57142857 | 0.77636582 | 0.78216481 | 0.0058 |
| 5 | 1 | 0.14285714 | 0.71428571 | 0.85831535 | 0.84568126 | 0.0126 |
| 5 | 2 | 0.28571429 | 0.71428571 | 0.92232317 | 0.89910909 | 0.0232 |
| 5 | 3 | 0.42857143 | 0.71428571 | 0.96293533 | 0.93735643 | 0.0256 |
| 5 | 4 | 0.57142857 | 0.71428571 | 0.98041761 | 0.96121281 | 0.0192 |
| 5 | 5 | 0.71428571 | 0.71428571 | 0.98052657 | 0.97176093 | 0.0088 |
| 5 | 6 | 0.85714286 | 0.71428571 | 0.96995878 | 0.97035464 | 0.0004 |
| 6 | 1 | 0.14285714 | 0.85714286 | 1.04613495 | 1.04461635 | 0.0015 |
| 6 | 2 | 0.28571429 | 0.85714286 | 1.11490512 | 1.10372914 | 0.0112 |
| 6 | 3 | 0.42857143 | 0.85714286 | 1.16745543 | 1.14395855 | 0.0235 |
| 6 | 4 | 0.57142857 | 0.85714286 | 1.19029403 | 1.16628669 | 0.0240 |
| 6 | 5 | 0.71428571 | 0.85714286 | 1.18278480 | 1.17206035 | 0.0107 |
| 6 | 6 | 0.85714286 | 0.85714286 | 1.16285241 | 1.16296362 | 0.0001 |

Non-linear Formulation

The solution process outlined for the Poisson equation provides the necessary foundation for using CAT for a class of non-linear problems. Consider the two-dimensional flow of an incompressible fluid. Given the dimensionless velocity v=(u, v) and the dimensionless pressure p, the governing equations are the incompressible Navier-Stokes equations:

$$\frac{\partial u}{\partial x} + \frac{\partial v}{\partial y} = 0 \tag{33}$$

$$u\frac{\partial u}{\partial x} + v\frac{\partial u}{\partial y} = -\frac{1}{\rho}\frac{\partial p}{\partial x} + \nu\left(\frac{\partial^2 u}{\partial x^2} + \frac{\partial^2 u}{\partial y^2}\right)$$

$$u\frac{\partial v}{\partial x} + v\frac{\partial v}{\partial y} = -\frac{1}{\rho}\frac{\partial p}{\partial y} + \nu\left(\frac{\partial^2 v}{\partial x^2} + \frac{\partial^2 v}{\partial y^2}\right)$$

in which $R_e$ is the Reynolds Number. One approach to solving these are the so-called Vorticity-Streamfunction Method. Let $$\zeta = \frac{\partial v}{\partial x} - \frac{\partial u}{\partial y} \tag{34}$$

$$u = \frac{\partial \Psi}{\partial y}$$

$$v = -\frac{\partial \Psi}{\partial x}$$

where z vorticity and Y is the stream function. When the above definitions are used in equation (33) we obtain the following system of Poisson equations:

$$\frac{\partial^2 \Psi}{\partial x^2} + \frac{\partial^2 \Psi}{\partial y^2} = -\zeta \tag{35}$$

$$\frac{\partial^2 \zeta}{\partial x^2} + \frac{\partial^2 \zeta}{\partial y^2} = R_e\left(u\frac{\partial \zeta}{\partial x} + v\frac{\partial \zeta}{\partial y}\right)$$

$$\frac{\partial^2 p}{\partial x^2} + \frac{\partial^2 p}{\partial y^2} = -2\left[\left(\frac{\partial v}{\partial x}\right)\left(\frac{\partial u}{\partial y}\right) - \left(\frac{\partial u}{\partial x}\right)\left(\frac{\partial v}{\partial y}\right)\right]$$

The above equations are the respective equations for the stream function, vorticity and pressure. It is not necessary to determine pressure solution until the stream function and vorticity distributions are known.

The CAT solution process will be iterative and include the following steps:

1. Divide the flow region into a grid of size N×N;
2. Start with some initial distribution for Ø and œ for all grid points;
3. Use Ø to compute the velocity field (u,v) via equation (34);
4. Obtain a new distribution for œ by differentiating the velocities;
5. With œ as the forcing function, solve equation (34) to obtain a new distribution for Ø;
6. Find a new velocity field from the Ø distribution;
7. Return to Step 3 if there is no convergence.

Treatment of Time

Derivatives in time are handled the same way spatial derivatives are obtained above. Use is made of time accurate transient CA differential operators (i.e., CA differential transform bases). Hence, for time-dependent function $f(t)$, discretized into $f_n$ (n=0,1,2 , . . . $N_T$–1) it is written:

$$\frac{df_n}{dt} = \frac{1}{\Lambda_n} \sum_{l=0}^{N_T-1} c_l D_{nl} \quad (36)$$

where $\Lambda_n$ are time-based scaling factors, while $D_{nl}$ are first-order CA differential operators.

If $f=f(x,t)$, then the discretization will result in $f_{in}$(i=0,1,2, . . . N–1;n=0,1,2, . . . $N_T$–1)

and $$\frac{\partial^2 f_{in}}{\partial x \partial t} = \frac{1}{\Lambda_{in}} \sum_{l=0}^{N_T-1} \sum_{i=0}^{N-1} c_{kl} D_{ik} D_{nl} \quad (37)$$

In general, for an order $p \geq 2$ derivative in time, and order $q \geq 2$ in space we have high-order CA differential operators $D^p$ and $D^q$ in the form:

$$\frac{\partial^{p+q} f_{in}}{\partial^p t \partial^q x} = \frac{1}{\Lambda_{in}} \sum_{l=0}^{N_T-1} \sum_{i=0}^{N-1} c_{kl} D_{ik}^q D_{nl}^p \quad (38)$$

Figure 3:
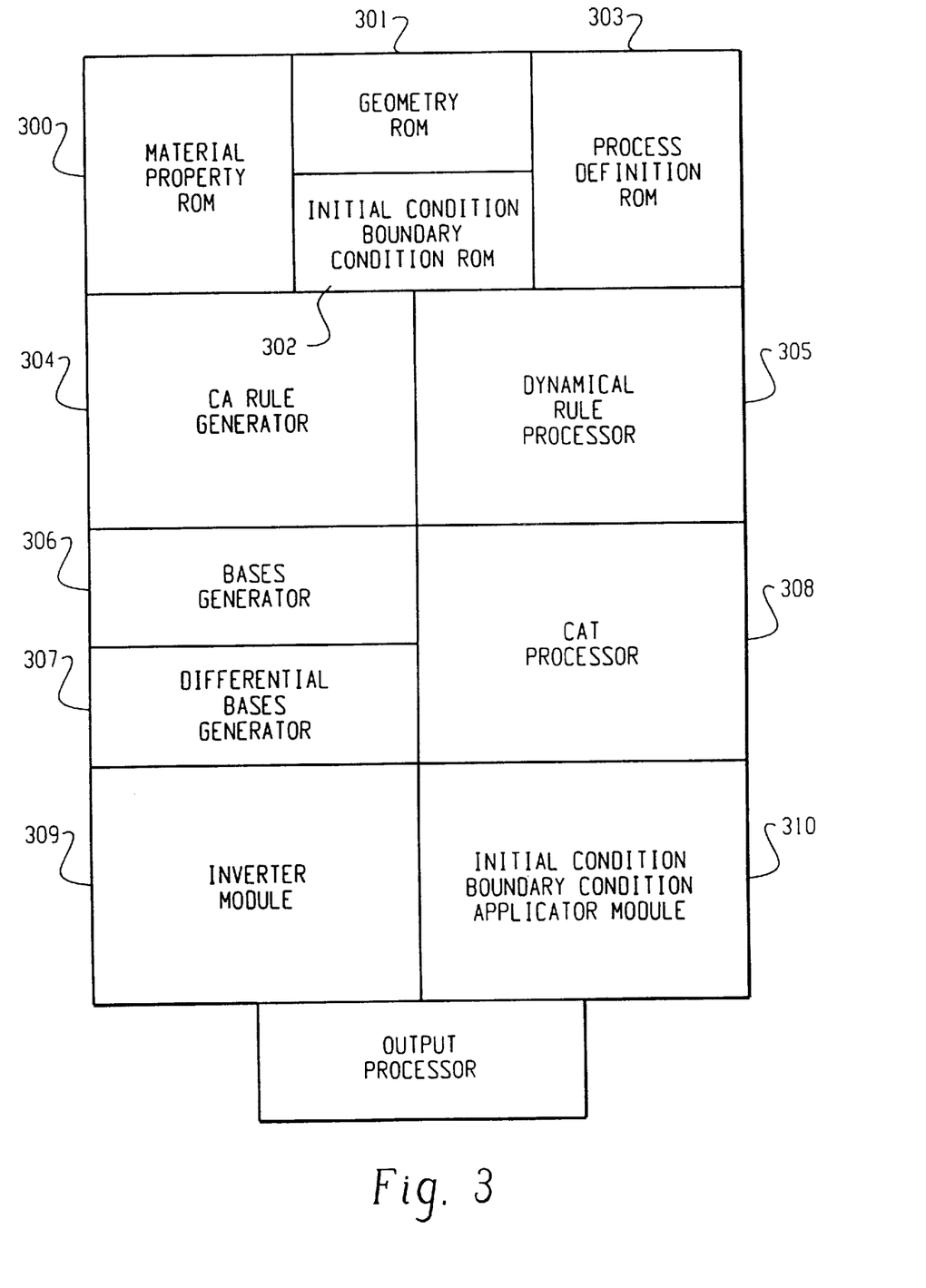
FIG. 3 illustrates an exemplary hardware arrangement in accordance with a preferred embodiment of the present invention.

An exemplary hardware arrangement in accordance with a preferred embodiment of the present invention will now be described with reference to FIG. 3. A preferred embodiment includes a Material Property ROM 300, a Geometry ROM 301, an Initial/Boundary Condition ROM 302, a Process Definition ROM 303, a Cellular Automata Rule Generator 304, a Dynamical Rule Processor 305, a Bases Generator 306, a Differential Bases Generator 307, a Cellular Automata Transform Processor 308, an Inverter Module 309, an Initial/Boundary Condition Applicator Module 310, and an Output Processor 311.

Each of the foregoing hardware components will now be described in further detail. Material Property ROM 300 inputs the constitutive property of the material e.g. viscosity, density, conductivity coefficient, elasticity coefficient, diffusivity etc. Geometry ROM 301 provides the shape, size including dimensions of the region in which the process takes place. Initial/Boundary Condition ROM 302 provides values, at time 0 and/or at the process boundary, of the primary variables (e.g. temperature, velocity, pressure, displacement, voltage, current etc.) being modeled. Process Definition ROM 303 provides the full description (e.g. by specifying the governing differential equations) of the process being modeled. Cellular Automata Rule Generator 304 produces or reads the "gateway keys" required for evolving the cellular automata. The gateway keys include the W-set coefficients, initial configuration, neighborhood size, total number of cells, the maximum state of the automata, and any other needed rule set parameters of the dynamical system. Dynamical Rule Processor 305 performs the evolution of the cellular automata given a set of gateway keys. Bases Generator 306 generates the building blocks, A, from the evolved field of the cellular automata. Differential Bases Generator 307 produces the differential bases, D, by mapping the building blocks into a continuous domain and carrying out the pertinent differential operations defined by Process Definition ROM 303. Cellular Automata Transform Processor 308 carries out the arithmetic operations required in transforming a given input into a given output using the building blocks A or D. Inverter Module 309 provides final solution by inverting the solution matrix H via, e.g. an iterative approach such as described above in equation (22). Initial/Boundary Condition Applicator Module 310 introduces the initial and boundary conditions to Inverter Module 309. Output Processor 311 displays, stores and/or transmits the final solution for the primary variables defined by Process Definition ROM 303.

The present invention has been described with reference to a preferred embodiment. Obviously, modifications and alterations will occur to others upon a reading and understanding of this specification. It is intended that all such modifications and alterations be included insofar as they come within the scope of the appended claims or the equivalents thereof.

Having thus described the invention, it is now claimed:

1. A system for modeling a physical process defined by a governing equation expressible in the form of at least one partial differential equation indicative of the dependence of the characteristics of the physical process on one or more independent variables, wherein the physical process is one of (a) potential flow, (b) heat conduction, (c) plate deformation, (d) vibration, (e) convective-diffusion, and (f) wave scattering, the system comprising:

first storage means for storing first data defining a constituitive property of the material;

second storage means for storing second data defining a physical region in which the physical process takes place;

third storage means for storing third data defining at least one of: initial conditions associated with the physical process, and boundary conditions associated with the physical process;

fourth storage means for storing fourth data defining said at least one differential equation associated with the physical process being modeled;

rule set generation means for generating rule set parameters for a dynamical system;

dynamical rule processing means for evolving the dynamical system using the rule set parameters;

transform bases generation means for generating transform bases from the evolved dynamical system;

differential transform bases generation means for generating differential transform bases by mapping transform bases into a continuous domain and performing differential operations in accordance with the at least one differential equation defined by the fourth data;

dynamical system processing means for determining a solution matrix H in accordance with the transform bases and the differential transform bases, inverting means for inverting the solution matrix H to generate a solution for the differential equation defined by the fourth data, wherein said inverting means receives the third data stored in the third storage means; and output means for outputting the solution for said at least one differential equation defined by the fourth data, said solution indicative of one of: a potential of a potential flow process, a temperature of a heat conduction process, a deformation of a plate deformation process, a displacement of a vibration process, a pressure of a convective-diffusion process, and a wave field of a wave scattering process.

2. A system according to claim 1, wherein said second data includes data indicative of shape and dimension of a region in which said physical process takes place.

3. A system according to claim 1, wherein said rule set parameters include at least one of: W-set coefficients, initial configuration of the dynamical system, neighborhood size, total number of cells of the dynamical system, and maximum state of the dynamical system.

4. A system according to claim 1, wherein said inverting means uses an iterative solution for inverting said solution matrix H.

5. A system according to claim 1, wherein said output means includes at least one of: display means for displaying the solution, storage means for storing the solution, and transmission means for transmitting the solution.

6. A system according to claim 1, wherein said dynamical system is cellular automata.

7. A method according to claim 1, wherein said dynamical system is cellular automata.

8. A method for modeling a physical process defined by a governing equation expressible in the form of at least one partial differential equation indicative of the dependence of the characteristics of the physical process on one or more independent variables, wherein the physical process is one of (a) potential flow, (b) heat conduction, (c) plate deformation, (d) vibration, (e) convective-diffusion, and (f) wave scattering, the method comprising:

storing first data defining a constituitive property of the material;

storing second data defining a physical region in which the physical process takes place;

storing third data defining at least one of: initial conditions associated with the physical process, and boundary conditions associated with the physical process;

storing fourth data defining said at least one differential equation associated with the physical process being modeled;

generating rule set parameters for a dynamical system;

evolving the dynamical system using the rule set parameters;

generating transform bases from the evolved dynamical system;

generating differential transform bases by mapping transform bases into a continuous domain and performing differential operations in accordance with the at least one differential equation;

determining a solution matrix H in accordance with the transform bases and the differential transform bases;

inverting the solution matrix H using said third data, to generate a solution for the differential equation; and outputting the solution for said at least one differential equation defined by the fourth data, said solution indicative of one of: a potential of a potential flow process, a temperature of a heat conduction process, a deformation of a plate deformation process, a displacement of a vibration process, a pressure of a convective-diffusion process, and a wave field of a wave scattering process.

9. A method according to claim 8, wherein said second data includes data indicative of shape and dimension of a region in which said physical process takes place.

10. A method according to claim 8, wherein said rule set parameters include at least one of: W-set coefficients, initial configuration of the dynamical system, neighborhood size, total number of cells of the dynamical system, and maximum state of the dynamical system.

11. A method according to claim 8, wherein said step of inverting uses an iterative solution for inverting said solution matrix H.

12. A method according to claim 8, wherein said step of outputting the solution for the differential equation defined by the fourth data includes at least one of: displaying the solution, storing the solution, and transmitting the solution.

* * * * *